UNITED STATES PATENT OFFICE.

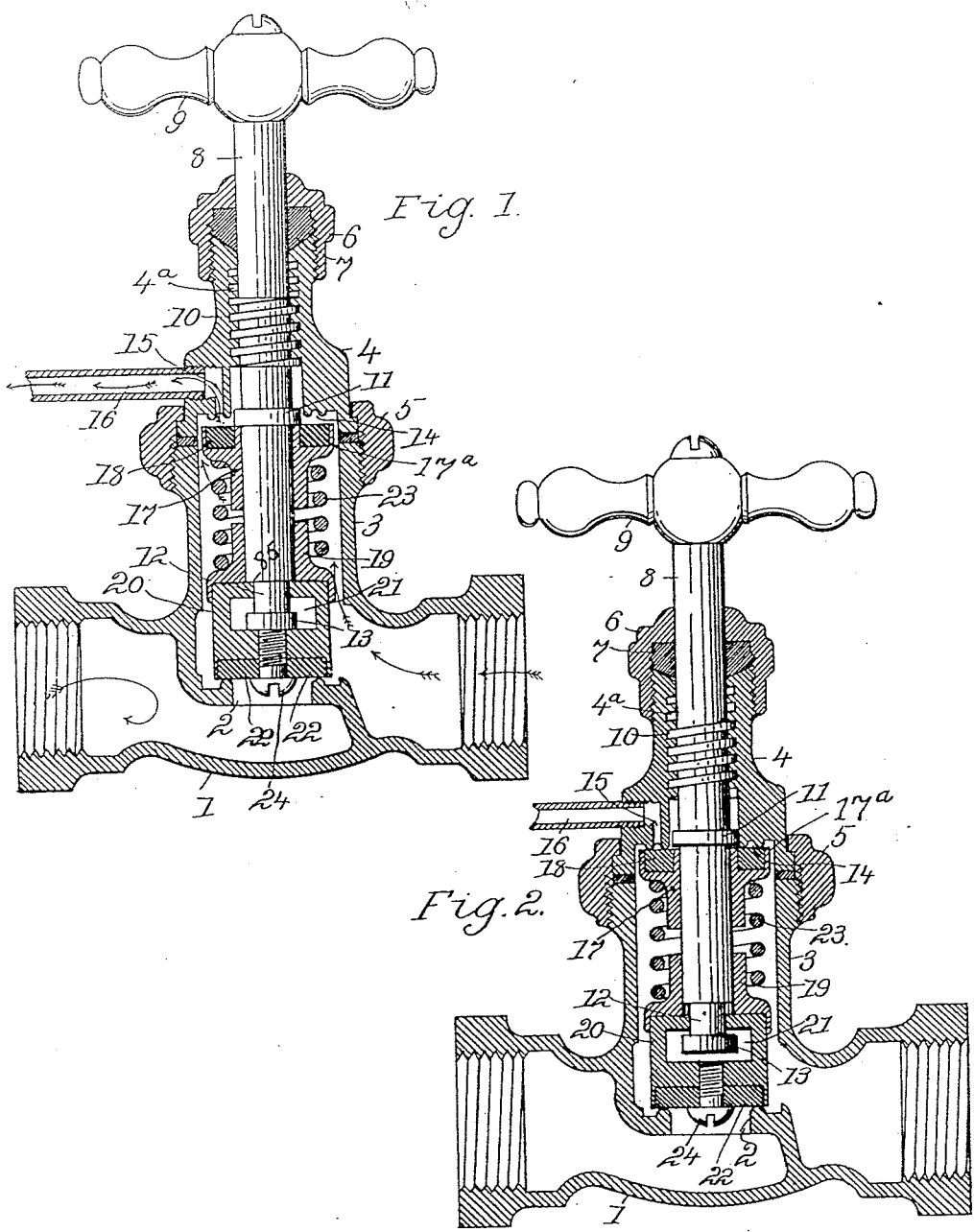

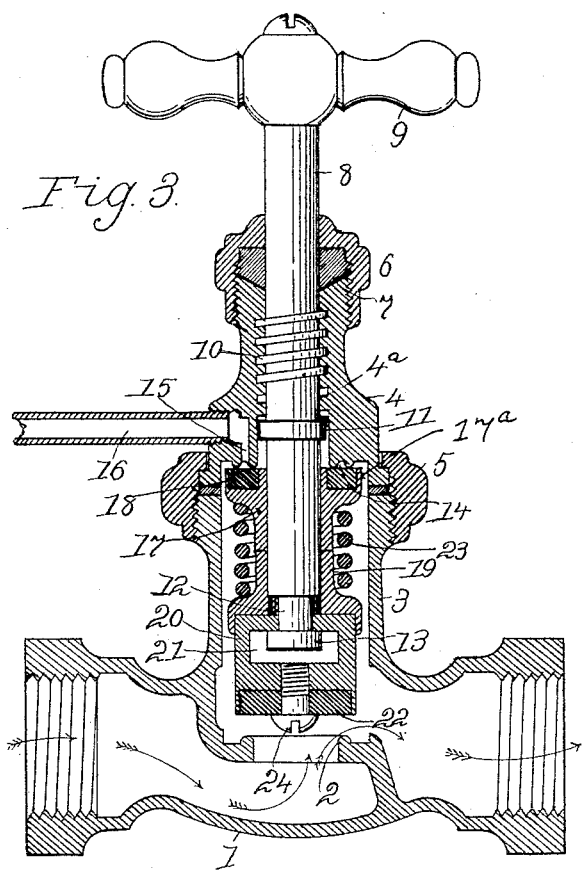

PHILIP MUELLER, OF DECATUR, ILLINOIS, ASSIGNOR TO THE H. MUELLER MANUFACTURING COMPANY, OF DECATUR, ILLINOIS, A CORPORATION OF ILLINOIS.

COMPRESSION STOP AND WASTE.

962,516.	Specification of Letters Patent.	Patented June 28, 1910.

Application filed March 8, 1906. Serial No. 304,991.

*To all whom it may concern:*

Be it known that I, PHILIP MUELLER, a resident of the city of Decatur, county of Macon, and State of Illinois, have invented a certain new and useful Compression Stop and Waste, of which the following is a specification.

The invention is applicable to stop and waste cocks of faucets, to hydrants, and to any other appliances that act on the stop-and-waste principle.

The principal object of the invention is to avoid opening the two valves of a compression stop and waste at the same time, thus precluding possibility of water under pressure reaching the packing or being forced through the waste; and another object is to insure the operation of the invention as an ordinary stop and waste in case the spring should become inoperative.

The invention is exemplified in the structure hereinafter described and it is defined in the appended claims.

In the drawings forming part of this specification the three Figures 1, 2, and 3, are each a central section lengthwise of a stop and waste cock embodying my invention. In Fig. 1 the main valve is shown closed and the waste valve is shown open. In Fig. 2 both valves are shown closed, preparatory to opening the main valve, and the parts are thus in an intermediate position. And in Fig. 3 the waste valve is closed and the main valve is opened.

In the drawings the numeral 1 designates the body of the cock which is here shown as of inverted T shape with a through passage across its head interrupted by a partition having a valve seat 2, and 3 is a lateral cylindrical extension whose axis alines with that of the seat. The cap or bonnet 4 having interior threads 4ª is connected in any suitable manner with the extension 3, and here shown a coupling nut 5 is swiveled on one member and threaded onto the other— suitable packing being interposed between the members. The waste valve seat 14 is preferably formed within and as a part of the cap 4, and is herein shown as consisting of two rings or bearing surfaces with an annular groove between them, from which groove a waste hole 15 communicates with the outlet 16. Above the waste valve seat and preferably at the upper end of the cap is a packing which is compressed by a packing nut 6, the initial pressure never reaches these elements for the reasons set forth below.

A valve stem 8 extends through the nut 6 and packing 7 and has threads 10 engaging the threads 4ª within the cap, the upper or outer end of the stem having a suitable handle 9. Near the lower end of the stem it is reduced as at 12 so as to produce a shoulder and again enlarged into a head or collar 13 at its extremity, and the main valve embraces this head and reduced portion in such manner as to permit it to have a certain free motion. As here shown, the shell 20 has a bearing surface for said shoulder pierced with a hole for the reduced portion and an enlarged cavity 21 within which the head or collar 13 fits loosely. The main valve disk 22 is mounted in the lower end of the shell 20, and is here shown as held in place by a screw 24. On the stem 8 is fixed a collar 11, beneath which is mounted loosely the shell 17ª of the waste valve, also having certain free motion, the annular waste valve disk 18 being located within said shell in position to coöperate with the seat 14. On the stem is located a separator which is of less length than the distance between the valves when they are distended to the fullest extent permitted by the collars 11 and 13. As here shown this separator is composed of two sleeves 17 and 19, and by preference they are integral with or connected with the valve shells 17ª and 20 so as to form guides for the latter. An expansive spring 23 holds the valves normally distended; and when the separator is made in the form of two sleeves as shown, they constitute convenient bearings for the opposite ends of the spring. By preference the stem is rotatable independently of both valves so that the latter are not necessarily ground upon their seats when they are closed.

In the operation of the complete device the main valve stands open as shown in Fig 3 wherein the stem has been turned in th proper direction to raise it off its seat an the separator has raised the waste valve s as to close it against its seat and shut o the waste opening. The two parts of th separator are here in contact and form sleeve or collar slidable on the stem sub stantially the same as if it were one s piece around the stem. In closing, th tial turning of the stem main valve to close on its seat, when the parts assume an intermediate position shown in Fig. 2 wherein both valves are closed and the initial pressure is shut off. Continued turning of the handle next brings the collar 11 against the waste valve and the free motion possessed by the main valve permits the parts to assume their final position as shown in Fig. 1 wherein the spring is compressed, the waste valve is unseated, and the waste under back pressure flows past the waste valve and out through the waste openings 15 and 16. Thus it will be seen that the only pressure which can possibly reach the packing 7 is the back pressure, but as the waste is open at this time the back pressure would never pass up between the threads 10 and 4ª.

In the position of parts shown in Fig. 1, it will be noted that the free motion between the stem and the shell of the main valve has permitted the shoulder 82 of the former to strike the bearing surface on the latter so that continued turning of the handle will force the main valve very reliably against its seat. Moreover, if the distance of the lower face of the load 13 below the shoulder is the same as the distance from the bearing face to the bottom of the cavity 21, as shown in the drawings, it will be noted that in this position of parts there is a second point of contact between the lower extremity of the stem and the main valve, and there therefore exists two bearing surfaces so that if contact should not take place between one of them by reason of wear or inaccurate formation it would take place between the other, and the main valve would be reliably seated in any event. If the valve disk 22 should become worn or a thinner one should be substituted, it is obvious that the tightening up of the screw 24 would cause its upper end to project slightly into the cavity where it would be struck by the collar or head 13 before the shoulder on the stem contacted with the bearing surface on the shell, but with either a thick or a thin disk 22 this construction of parts would always present at least one bearing surface on the main valve which would be engaged by the lower end of the stem at a proper time to reliably seat said valve after the waste valve had been opened. It is not inconsistent with the present invention that the sleeve 17 be made a trifle longer than herein shown. Such construction would cause the inner ends of the sleeves to abut earlier when they approached each other, and the main valve would not open so wide as shown in Fig. 3; and, as shown in Fig. 1, it might be possible for said inner ends of the sleeves to abut at the same moment that the lower end of the stem engaged one or of the bearings surfaces on the main construction would afford means for causing the collar 11 to force the separator downward and press it upon the bearing surface on the top of the shell 20 to reliably grind the main valve upon its seat whether the shoulder on the stem or the lower face of the head 13 performed this function or not.

If the spring 23 should break or become weak or even be omitted, this device would still be a compression stop and waste, the same as in a standard or solid stem compression stop and waste, except that it would lose the feature of having one valve closed before the other opens. That is to say, starting from the position shown in Fig. 3, the initial movement of the stem toward closing the main valve would perhaps immediately unseat the waste valve unless the pressure were sufficient to keep it seated; and in the intermediate position both valves would be open and the pressure might possibly reach the packing 7 although it would be diminished by reason of the leakage through the waste. Further rotation of the stem, however, would positively unseat the waste valve against any existing pressure when the collar 11 contacted with it; and the closed condition would be substantially that shown in Fig. 1. In other words, the separator— whether in one or more members and whether they were connected with the valves or not—would then serve the function of closing the waste valve when the main valve was completely open as shown in Fig. 3, but of course it would not prevent the waste valve from dropping off its seat as the stem was turned to close the main valve, although the arrangement of parts is such that the initial pressure would probably perform this function.

What is claimed as new is:

1. In a device of the character described, a body having inlet and outlet with a main valve seat between, a valve for said seat, an exhaust communicating with the interior of the body, and a freely movable waste valve independent of the main valve and having a plurality of seating points for controlling said exhaust.

2. In a device of the character described, a body having inlet and outlet with a main valve seat between, a main valve therefor, an exhaust, and a waste valve loosely connected with a support independent of the main valve and having two seating points for controlling the exhaust, one of them closing communication from it to the support.

3. In a device of the character described, a body having inlet and outlet with a main valve seat between, a main valve therefor, an exhaust, a waste valve loosely connected with a support independent of the main valve and having two seating points for controlling the exhaust such length as to permit certain free motion with respect to said collars, and an expansive spring surrounding the sleeves and stem and tending to force the valves apart.

25. In a compression stop and waste, the combination with a body having a through passage across one end connected with inlet and outlet and provided with a partition having a main valve seat, a lateral extension in axial line with said seat and itself having a waste valve seat, and a waste opening leading from said waste valve seat; of independent valves for the seats, a lengthwise-movable stem on which the valves are loosely mounted, the main valve closing against and the waste valve with the initial pressure, and means for limiting the outward movement of said valves.

26. In a compression stop and waste, the combination with a body having a through passage provided with a main valve seat, and a waste outlet and valve seat opposite said main valve seat; of independent valves for the seats, a lengthwise-movable stem on which the valves are loosely mounted, the main valve closing against and the waste valve with the inlet pressure, means for limiting the outward movement of said valves toward their seats, and a spring tending to seat both valves.

In testimony whereof I sign my name in the presence of two subscribing witnesses.

PHILIP MUELLER.

Witnesses:
JOHN L. WADDELL,
ANNA MURPHY.